Figure 1:
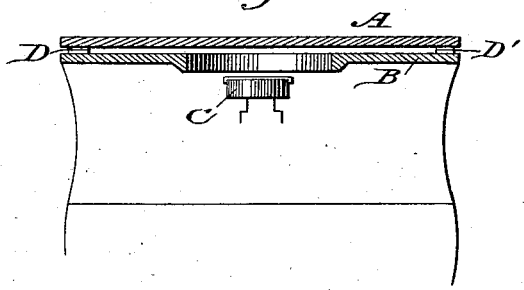
Figure 2:
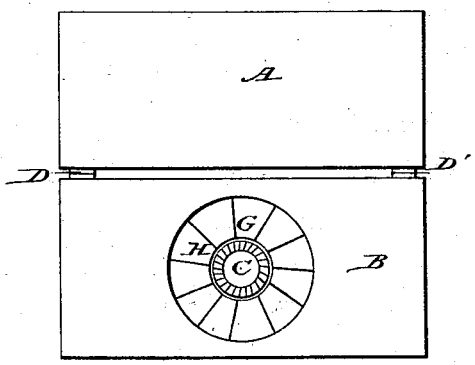

(No Model.)

A. B. SHAW.
STOVE.

No. 507,937. Patented Oct. 31, 1893.

Witnesses.
C. N. Ingraham
J. R. Booth

Inventor.
Ada B. Shaw

UNITED STATES PATENT OFFICE.

ADA B. SHAW, OF LA HARPE, ILLINOIS.

STOVE.

SPECIFICATION forming part of Letters Patent No. 507,937, dated October 31, 1893.

Application filed April 24, 1893. Serial No. 471,724. (No model.)

*To all whom it may concern:*

Be it known that I, ADA B. SHAW, a citizen of the United States, residing at La Harpe, county of Hancock, State of Illinois, have invented a new and useful Improvement in Cooking-Stoves, of which the following is a specification.

My invention relates to improvements in cooking stoves which derive their heat from open flame, vapor, or gasoline burners and the object of my invention is to provide means whereby the heat from the burner can be diffused, distributed and modified by conduction through a solid homogeneous metallic plate to suit the demands of ordinary cooking. I attain this object by mechanism illustrated in the accompanying drawings in which—

Figure (1) is a vertical section of the top of a stove with my improvement in place for use. Fig. (2) is top of stove with my improvement turned back.

Similar letters refer to similar parts throughout both views.

"A." is a solid metallic plate placed over the top of stove "B." as is shown in Fig. (1).

"B." is top of stove with opening over burner and grate "H."

"D D." are hinges. In use the plate A is placed over the top of stove B and different cooking vessels are placed in position on top of plate A where the temperature suits the article being cooked.

The plate A can be removed by means of the hinges "D D" and cooking vessels placed in the flame over the burner.

In carrying out my invention I prefer to provide for the removal of plate A by hinges D D, and further, in stoves having more than one burner, to divide the heat distributing plate A in proportion to parts of the top of stove occupied by each and several burners used.

A striking advantage of my invention is that a larger number of cooking vessels may be in cooking position at one time.

I am aware that prior to my invention open-flame vapor stoves have been made with small plates placed in the openings in the tops of stoves and covering the grate and burner. I therefore do not claim broadly all manner of plate or plates placed in all manner of position in combination with top of stove and burner, nor do I claim any particular form of plate, but What I do claim as my invention, and desire to secure by Letters Patent, is—

The removable heat distributing plate A placed above and largely covering the top of stove B, and in combination with the hinges D D top of stove B and burner C substantially as and for the purpose set forth and described.

ADA B. SHAW.

Witnesses:
JOHN H. HUNGATE,
JOSEPH R. CRABILL.